United States Patent [11] 3,567,045

[72] Inventors William G. Albright
Champaign;
Charles F. Kiser, Jr., Hoopeston, Ill.
[21] Appl. No. 845,451
[22] Filed July 28, 1969
[45] Patented Mar. 2, 1971
[73] Assignee FMC Corporation
San Jose, Calif.

[54] MAGNETIC CAN HANDLING APPARATUS WITH DEMAGNETIZATION
14 Claims, 16 Drawing Figs.

[52] U.S. Cl. .................................................. 214/1,
294/65.5, 214/152
[51] Int. Cl. ................................................. B66c 1/08
[50] Field of Search ........................................ 214/1 (BS),
1 (BS2), 1 (BS3), 1 (BS4); 294/65.5

[56] References Cited
UNITED STATES PATENTS
2,071,859 2/1937 Steiner ..................... 214/1(BS2)X
2,143,026 1/1939 Nordquist .................. 214/1(BS2)X Primary Examiner—Gerald M. Forlenza
Assistant Examiner—George F. Abraham
Attorneys—F. W. Anderson and C. E. Tripp ABSTRACT: Apparatus for transferring cans between a pallet and a conveyor picks up and deposits the cans by means of carriage mounted electromagnets. The DC source for the electromagnets is a bridge embodying silicon controlled rectifiers. A silicon controlled clamping rectifier is connected across the DC source and gated for passing current through the magnets only in the direction of the magnetic field collapsed current. When the magnets are deenergized the clamping silicon controlled rectifier is fired to short out the current generated by collapse of the magnetic field. This isolates the magnets from the rectifier bridge and permits it to operate under remote control of the switch for energizing and deenergizing the magnets. An incandescent lamp heated by AC is connected across the magnets when the clamping silicon control rectifier is cut off. Energization of the electric lamp demagnetizes the magnets within a few cycles after the AC is applied to the lamp.

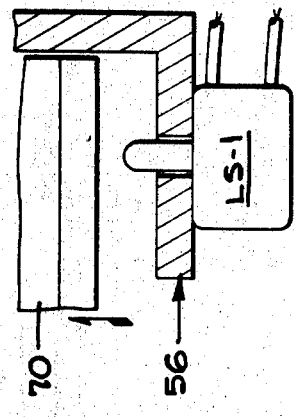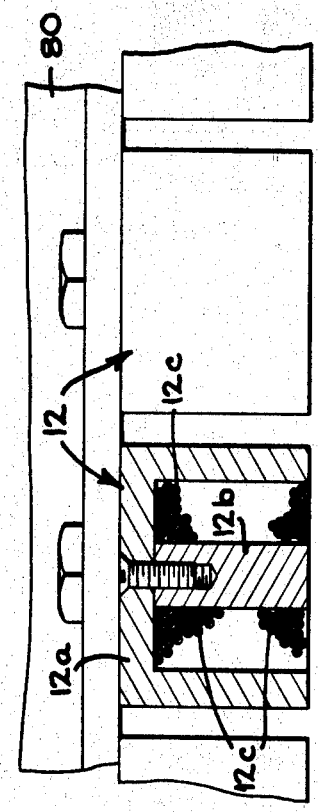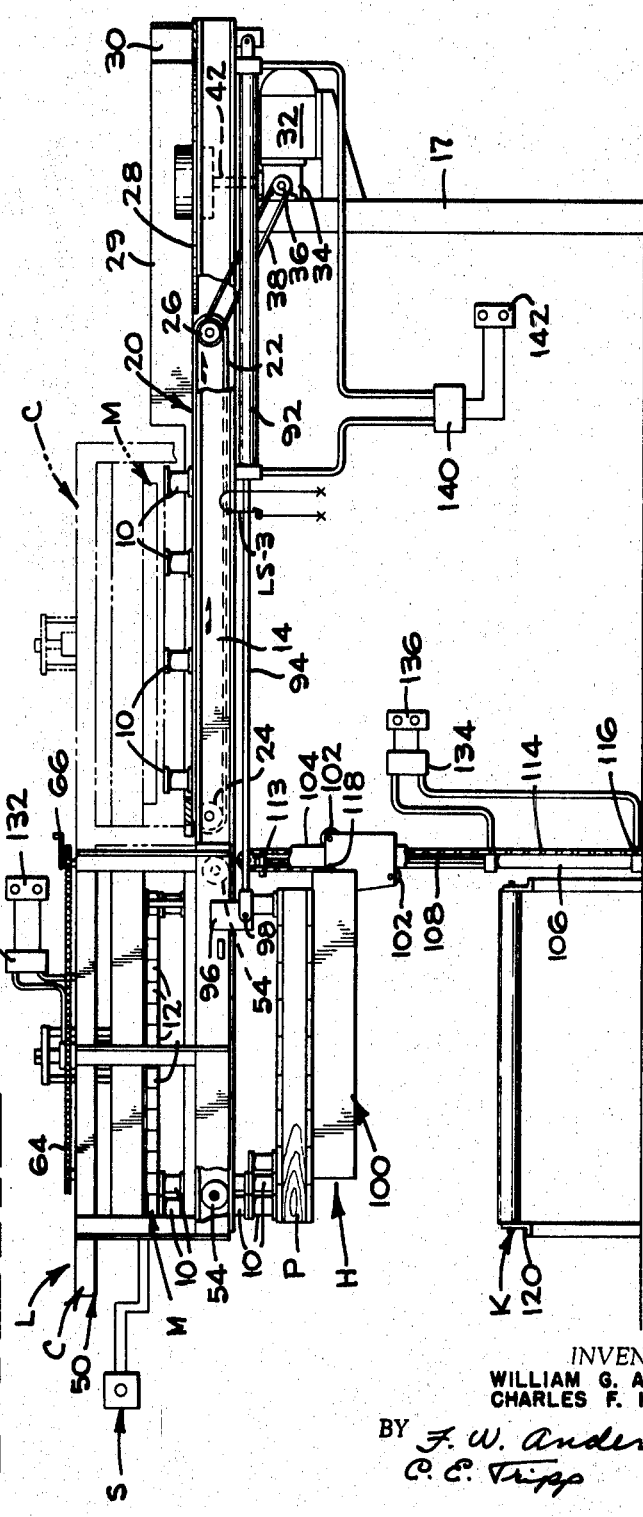

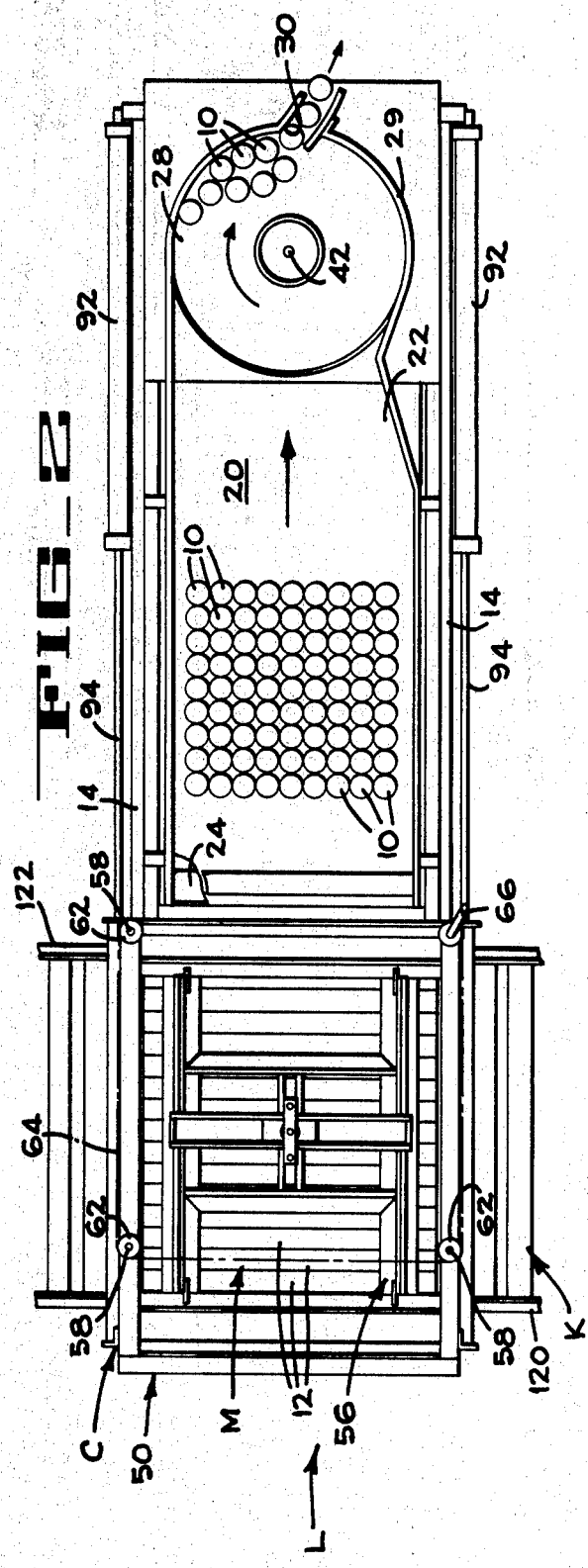

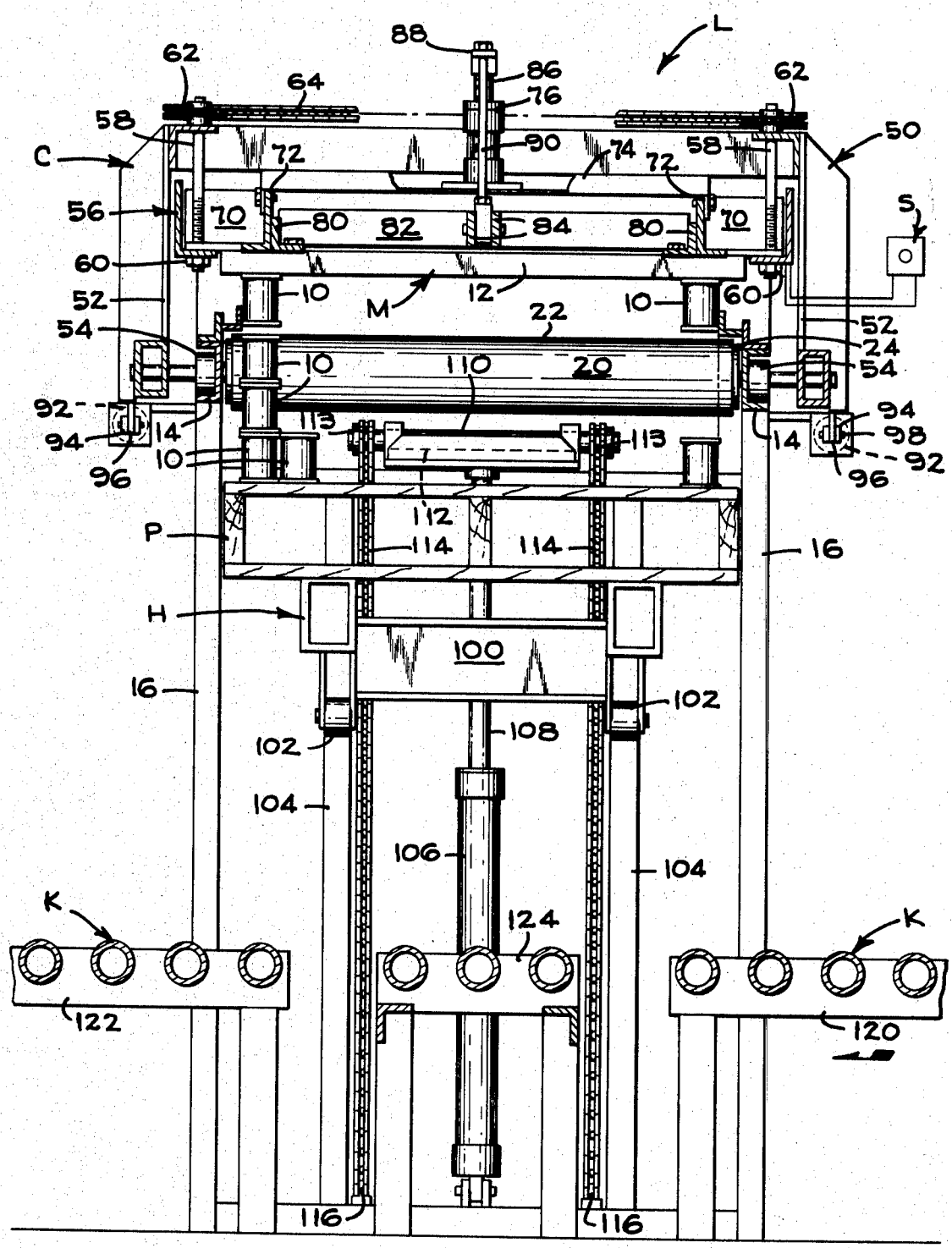
FIG_3

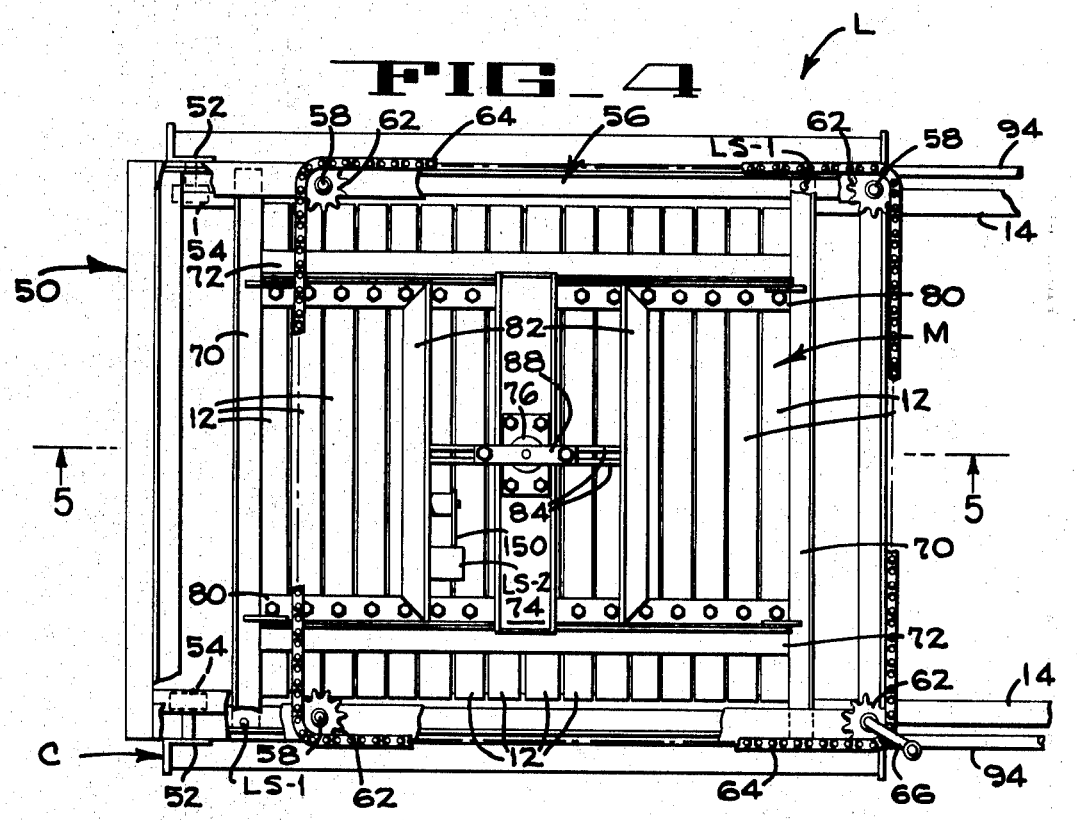
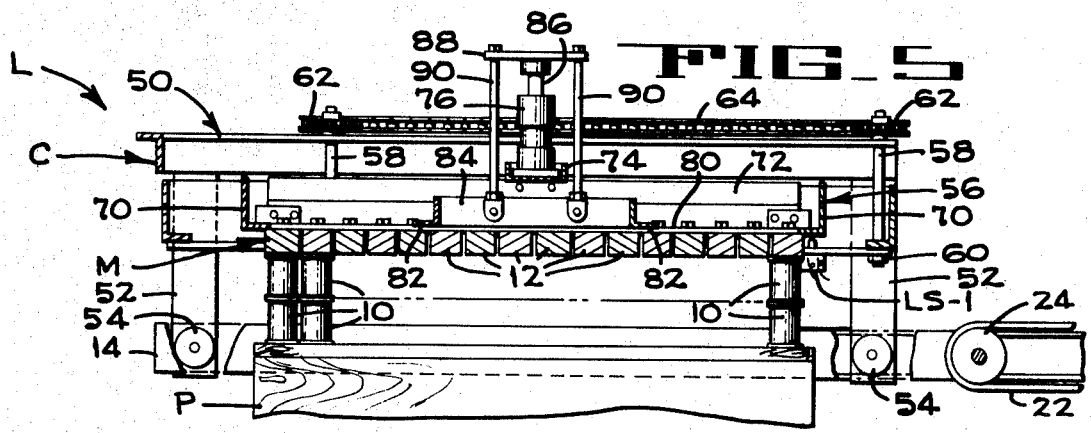
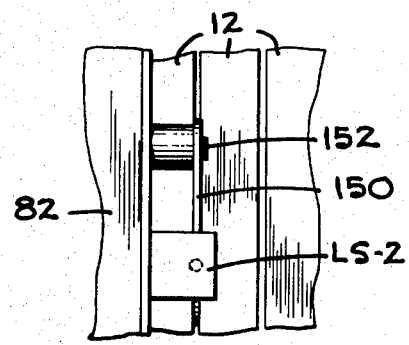
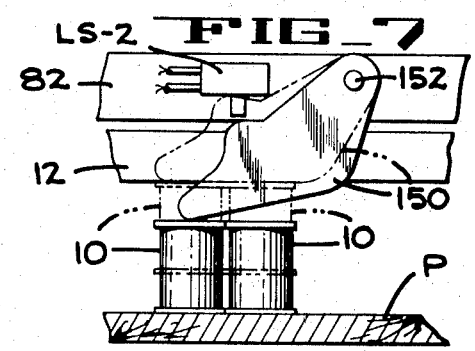

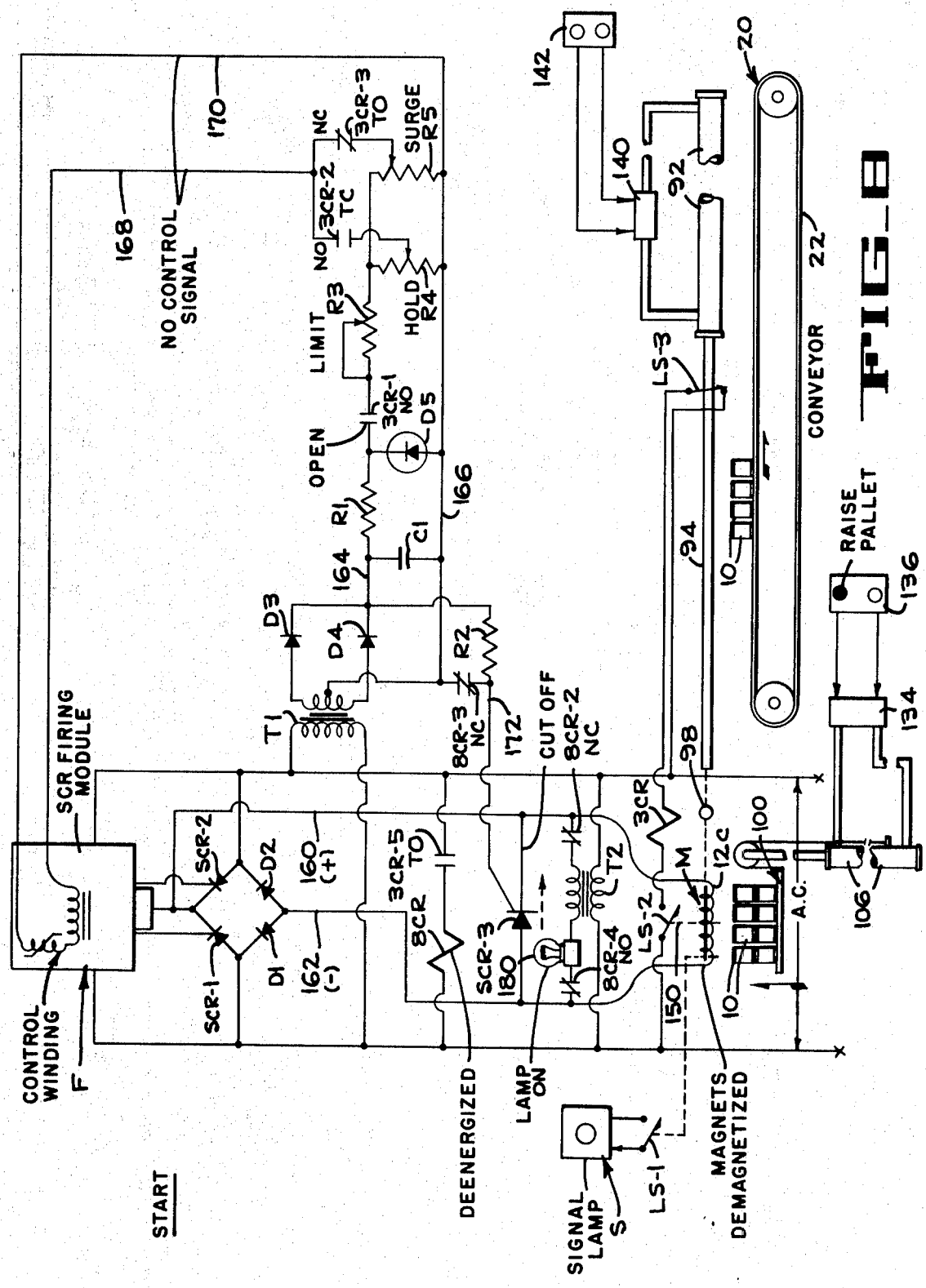
FIG_8

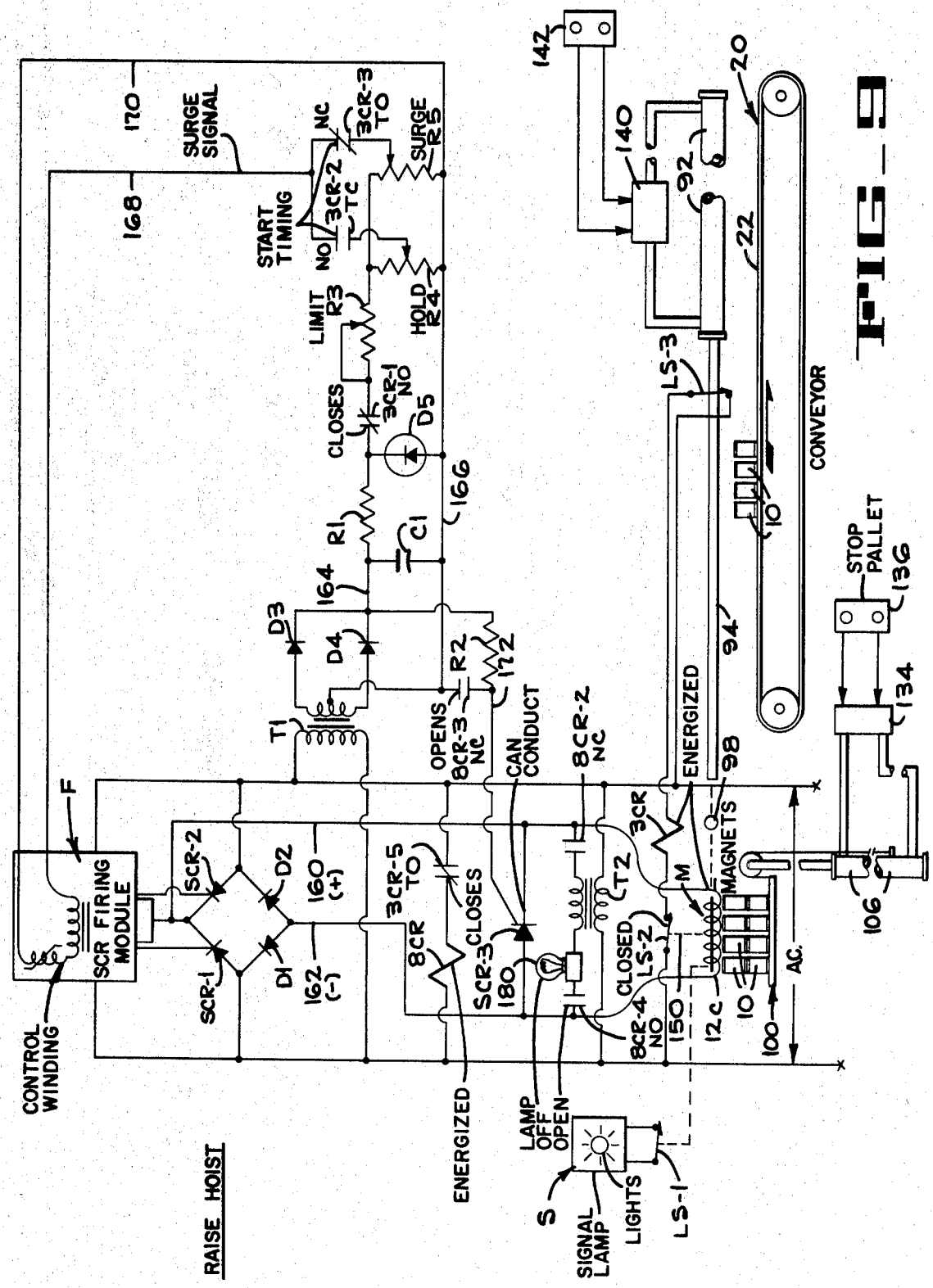

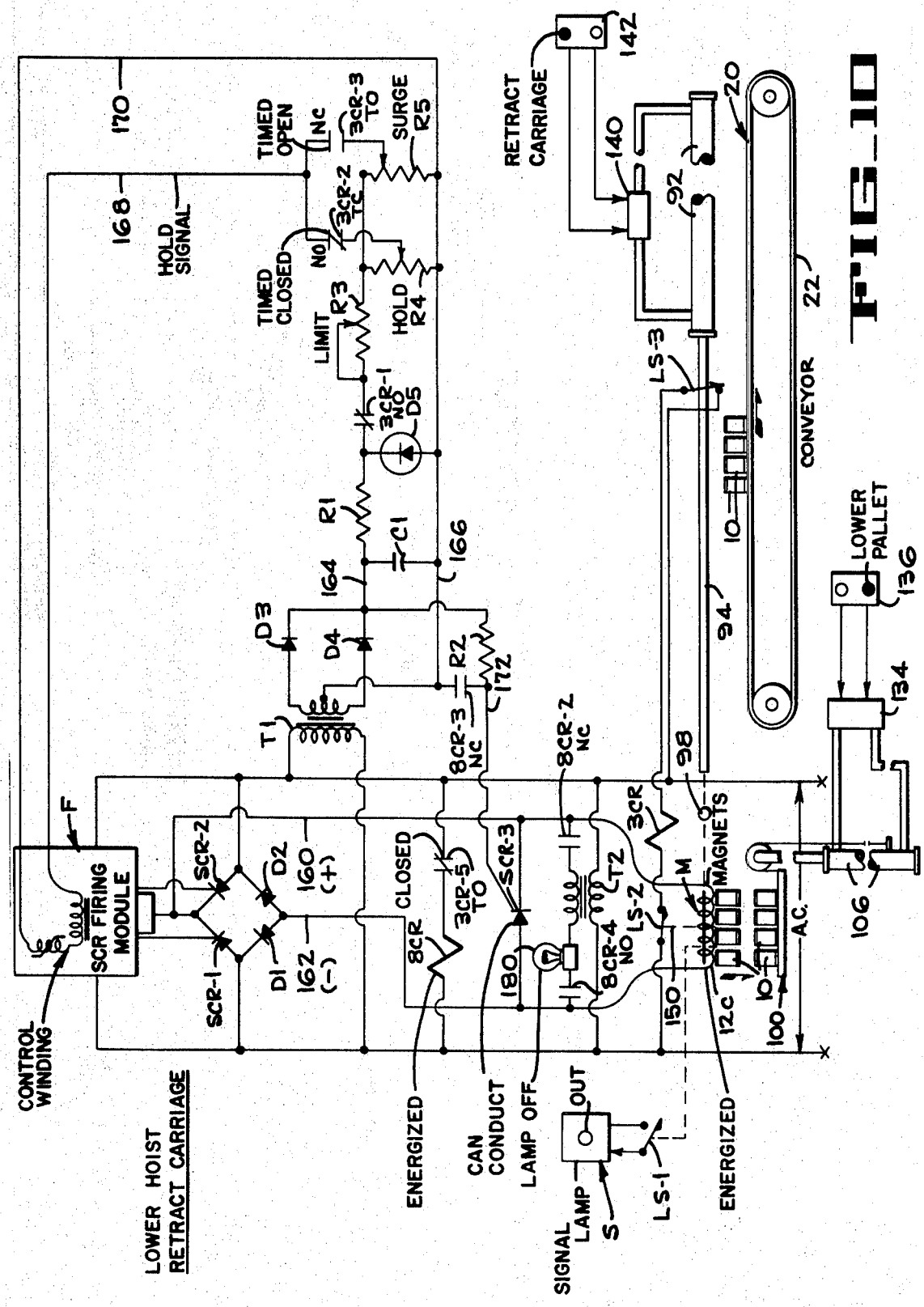

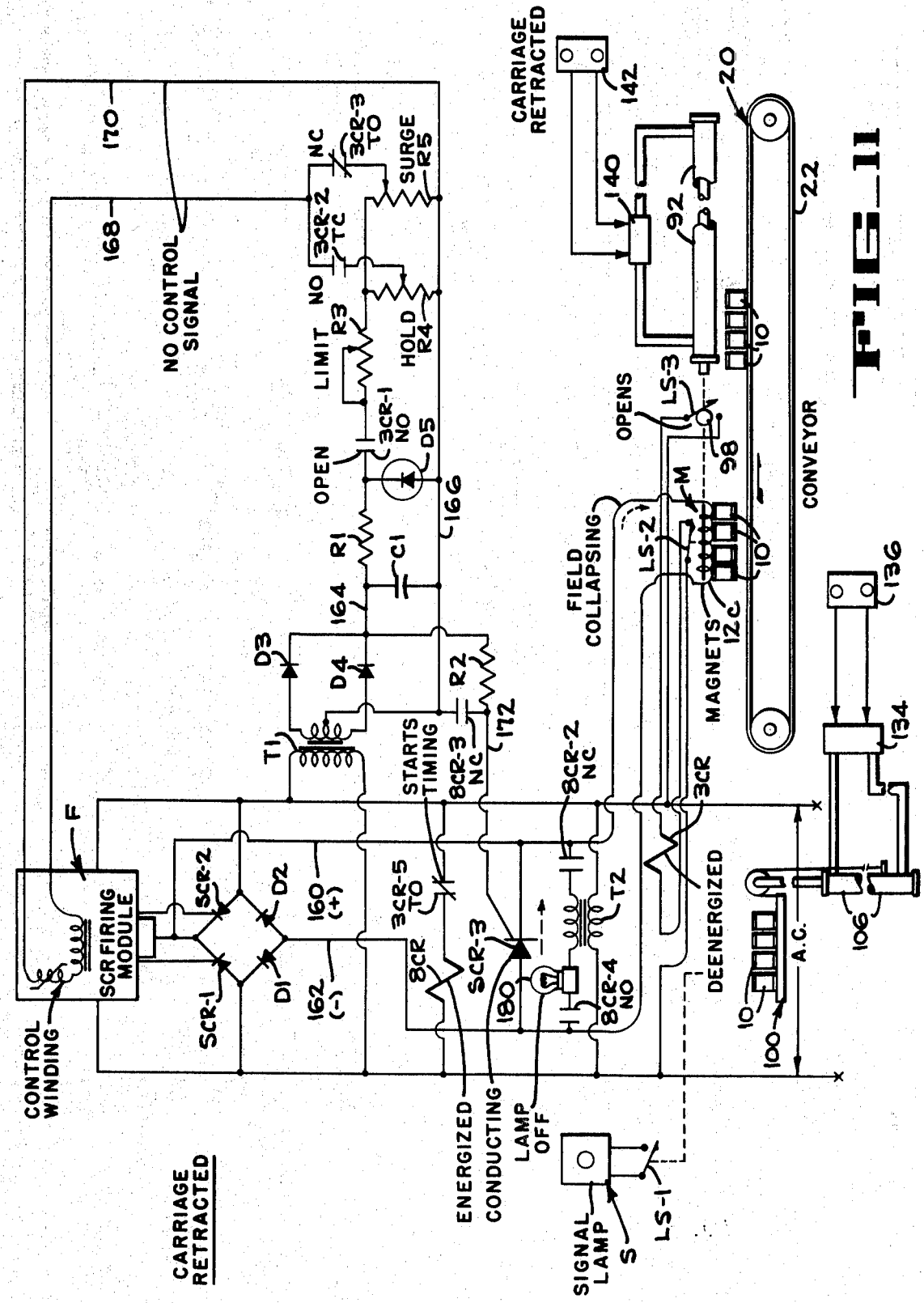

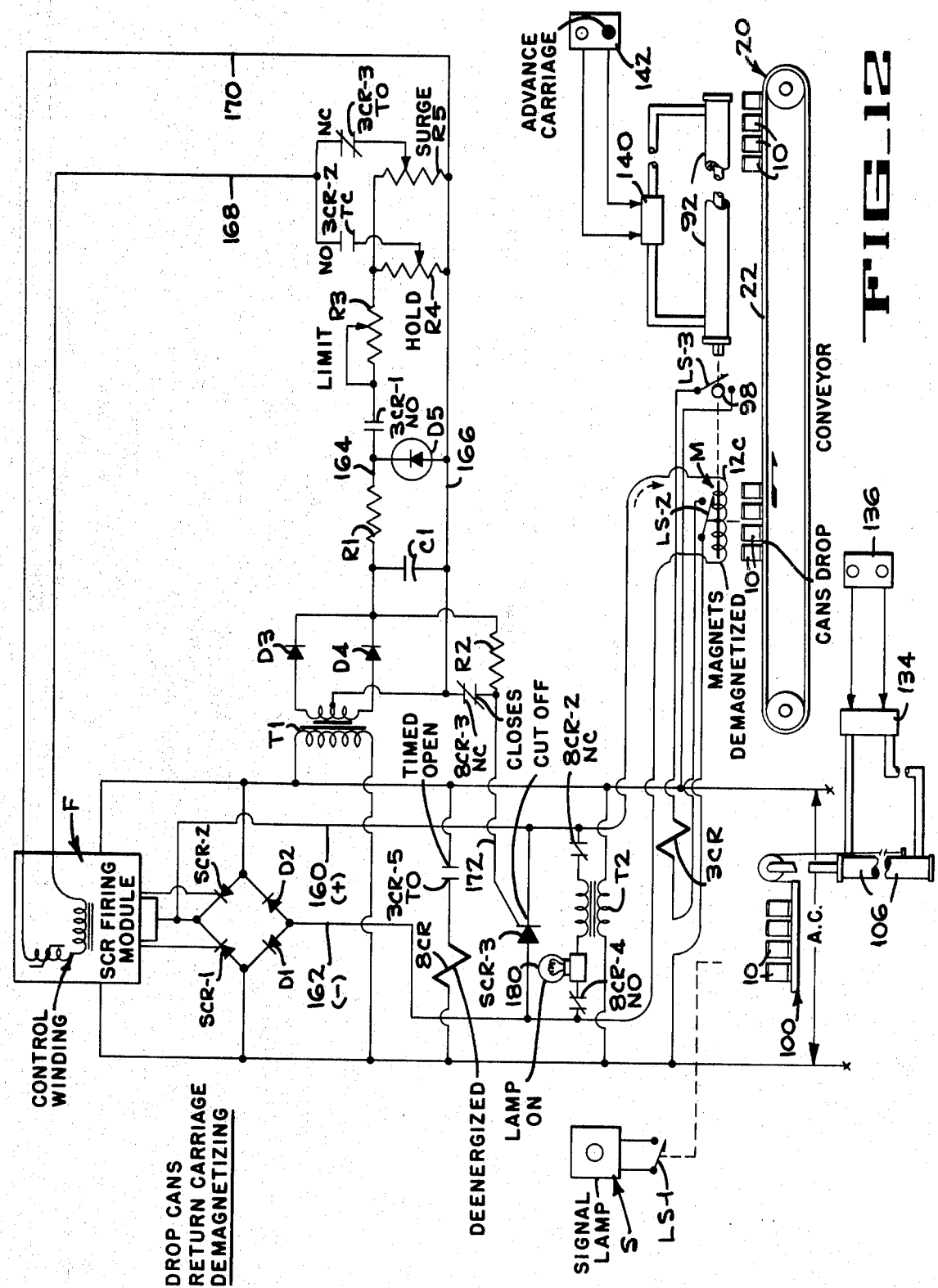

MAGNETIC CAN HANDLING APPARATUS WITH DEMAGNETIZATION

SUMMARY OF THE INVENTION

This invention will be described as applied to a depalletizer, that is, an apparatus for unloading patterns of tin cans from a pallet hoist to a distribution conveyor. The apparatus, in addition to the pallet hoist and conveyor includes a reciprocating carriage travelling between these elements and mounting electromagnets for picking up and releasing patterns of cans. Heretofore difficulties have been encountered in the use of electromagnets for this service, the result being that vacuum cups and the like are commonly employed. The difficulties mentioned occur in related fields, first in the switch circuitry for energizing and deenergizing the magnets without damage to the switches while accommodating the currents through the magnets; and second, the problem of residual magnetism after deenergization of the magnets which magnetism sometimes tends to hang cans up on the magnets when they should be released, thereby destroying or distorting patterns.

One readily controllable DC source for magnets is a DC rectifier bridge incorporating silicone controlled rectifiers operated by a magnetic amplifier and a low voltage DC control circuit. The magnet energizing and deenergizing switch devices can operate the control windings for causing gated conduction of the bridge and hence there is no contact arcing and deterioration of the magnet switches. However, when deenergizing magnets are controlled by such a circuit, the current generated by collapse of the magnetic field in the magnets feeds back to the DC source bridge and prevents turning off the silicon control rectifiers in that bridge when the AC supply goes negative. Attempts to compensate for this failure of the silicon controlled rectifiers in the bridge to "turn off" or "commutate" upon reversal of the AC supply by bolstering the negative current of the AC supply results in damage to the bridge.

It has also been proposed to place a diode across the magnets which shorts out the magnetic field collapse current (clamping) to eliminate these problems of feedback to the bridge circuit, but in the circuit of the present invention this has another disadvantage. In accordance with the present invention an AC current source is applied to the deenergized magnets to rapidly shrink the hysteresis cycle of these magnets and bring their field back to zero within a few AC cycles. A clamping diode type such as that referred to above would short out one-half of the AC demagnetizing circuit and hence that circuit would not be effective. In accordance with the present invention, instead of a clamping diode, a silicon controlled rectifier is shunted across the magnet circuit and gated for conducting the field collapse current of the electromagnets. This solves the problems of contact arcing and feedback to the DC bridge source and also solves the problem of making it possible to shunt the magnets with an AC magnetizing source. The latter problem is solved for the reason that the silicon controlled rectifier used as a clamping or shorting device presents a very high resistance to current flow in both directions when the rectifier is cut off or not firing. Thus, the presence of a silicon controlled rectifier across the electromagnets in place of a clamping diode as just mentioned makes it possible to also connect an AC demagnetizing source across the magnets for rapid demagnetization as just described.

It has been under the present invention that a heating resistance element is necessary in the AC source to rapidly decrease the AC demagnetizing current to rapidly bring the field of the electromagnets back to substantially zero flux density. However, an ordinary resistance element (such as nichrome wire) which is chosen to supply an initial demagnetizing current sufficient to go through the remanence point of the hysteresis cycle of the magnets (and hence effectively demagnetize them) will not heat up instantly and hence will not decrease the demagnetized current with sufficient rapidity to be effective and practical. Under the present invention this problem is solved by the use of a hermetically sealed tungsten-type electric heating element such as an ordinary electric light bulb in the AC demagnetizing circuit. This bulb, when selected to have the proper nominal wattage, initially provides sufficient current to pass the flux through the remanence point of the hysteresis loop and yet heats so rapidly that the AC demagnetizing current is reduced so as to bring the flux density of the magnets back to zero in only a few cycles of the AC demagnetizing source. Also, being hermetically sealed, the life of the AC demagnetizing resistance is long, even though it might initially pass a high current and become red hot for rapidly decreasing such current as previously described. These bulbs also cool rapidly for short operational cycles.

The circuitry and components of the system just described cannot only be employed for the unloading of cans from a pallet hoist and transferring them as a pattern to a distribution conveyor but can be applied to apparatus for loading the pallet hoist from such a conveyor.

BRIEF DESCRIPTION OF THE DRAWINGS

FIG. 1 is a side view of a pallet hoist unloader embodying the present invention.

FIG. 1A is an enlarged fragmentary view of a signal switch.

FIG. 1B is an enlarged fragmentary section of a magnet.

FIG. 2 is a plan view of the unloader.

FIG. 2A shows a hysteresis diagram.

FIG. 2B is an AC demagnetizing cycle diagram.

FIG. 3 is an end view of the unloader with portions being broken away.

FIG. 4 is a plan of the carriage with portions being broken away.

FIG. 5 is a central vertical section taken on the line 5-5 of FIG. 4.

FIG. 6 is a fragmentary plan of the magnet blade switch.

FIG. 7 is a side view of the magnet blade switch.

FIGS. 8—12 are electrical diagrams showing an operation sequence.

GENERAL DESCRIPTION OF THE UNLOADER

FIGS. 1—5 show in simplified form a pallet unloader L embodying the present invention. The principle components of this unloader have counterparts in a pallet loader-unloader previously manufactured by the FMC Corp. and identified as the Stackmatic Pallet Unloader, the device of the present invention being an improvement in the prior machine. Except for the motor drive for the conveyor, the other elements are controlled hydraulically. Actually the machine as manufactured and sold a has automatic switch and interlock devices so that it is self-sequencing. Generally speaking, the automatic sequencing features of the device (being known and conventional) are neither critical nor essential to the present invention. Thus, in order to distinctly describe and point out the invention in this case, the hydraulic cylinders, pumps, sequencing switches, solenoid valves, etc., are illustrated in their simplest diagrammatic form, and instead of showing an automatic control circuit for the operating cylinders, simple pushbuttons are indicated. The features of the present invention cannot only be employed in a pallet unloader (as illustrated) but can be employed in a pallet loader such as that shown in the copending U.S. application of Forshier et al., Ser. No. 746,568, filed Jul. 22, 1968 and assigned to the FMC Corp.

The basic elements of the unloader L include an endless draper conveyor 20 and a magnetic pickup head M mounting a series of electromagnets 12. The magnetic head is mounted on a reciprocating carriage C that moves between pallet overlying and conveyor overlying positions. Associated with the unloader is a pallet hoist H, which raises a pallet P loaded with tiers of cans 10 up to a can unloading position and which successively raises the pallet after each tier or pattern of cans 10 has been removed from the a pallet for deposit on the conveyor 20. For convenience a pallet conveyor K, which is of conventional design, runs along the pallet hoist end of the machine, for supplying loaded pallets to the hoist platform and for facilitating removal of empty pallets therefrom.

The unloader has a frame that includes carriage tracks 14 (FIG. 3) supported on front legs 16 and rear legs 17 (FIG. 1). Various frame crosspieces are provided. The conveyor 20 includes a draper belt 22 that is trained around an idler pulley 24 and a drive pulley 26. The conveyor delivers cans 10 to a singulating turntable 28 (FIG. 2) which is surrounded by a fence 29 having a singulating discharge mouth 30. The conveyor belt 22 normally runs continuously and advances patterns of cans as they are deposited on the conveyor to the singulator turntable 28. The details of the singulator are not essential to the invention.

The conveyor 20 is a driven by a motor 32 having a gearbox 34 (FIG. 1) with a drive pulley 36 that drives the pulley 26 of the conveyor by a V-belt chain 38. The gearbox 34 also drives a vertical shaft 42 (FIG. 1) which rotates the turntable 28 (FIG. 2). The nature of the conveyor drive is not critical to the present invention so long as it can be reversed in case the machine is to be employed as a pallet loader.

CARRIAGE

The carriage C, which mounts the magnetic pickup head M, reciprocates from a can pickup position over the pallet P (solid lines in FIG. 1) to a can release position over the pallet P (solid lines in FIG. 1) to a can release position over the conveyor 20 (broken lines). The carriage has a rectangular framework 50 (FIG. 4) with four depending legs 52 mounting rollers 54 that reciprocate in the guide channels 14 on the frame. A U-shaped vertically adjustable subframe 56 is suspended from the main carriage frame 50 by means of four threaded adjustment rods 58. The rods 58 are rotatably mounted in the main carriage frame 50 and are threaded in nuts or the like 60 welded to the subframe 56 as best seen in FIG. 3. The upper ends of the rods 58 carry sprockets 62 which are all connected by a chain 64 and one of the threaded rods 58 can be rotated by a handle 66 (FIG. 4) thereby simultaneously turning all of the threaded rods and raising or lowering the subframe 56. This adjustment is provided to accommodate cans of various heights.

The magnets 12 can be independently raised and lowered by a hydraulic cylinder assembly, but during the unloading operation this assembly is actuated to raise the magnets to their uppermost position and left there, which is the position shown in the drawings. However, the magnets 12 are supported only by gravity in a manner whereby they can be raised to a limited extent by the lifting action of the pallet hoist, in order to operate parallel-connected signal switches the purpose of which will be described presently.

The magnets are suspended from the subframe 56 previously described by means of crossbars 70, the ends of which rest on and are supported by the subframe 56 as seen in FIGS. 3 and 4. The crossbars 70 are welded to longitudinal rails 72 and these rails are bridged by a central channel 74 which mounts the hydraulic magnet raising cylinder 76 previously referred to.

The magnets 12 are bolted to angles 80 which run parallel to the angles 72 just described (FIG. 4). In order that the hydraulic cylinder 76 can raise and lower the magnets during the loading operation as described in the aforesaid copending application of Forshier et al., the magnet mounting angles 80 are connected by crosspieces 82 (FIGS. 3 and 4) and the crosspieces are joined by central lifting brackets 84 which run parallel and are closely spaced. The piston rod 86 of the cylinder 76 (FIG. 3) has secured at its upper end a bracket 88 (see also FIG. 4) from which depend vertical rods 90 that are pinned to the crosspieces 84. As mentioned, during the loading operation the hydraulic cylinder 76 is actuated so that the piston rod lifts the magnets 12 up against the lower surfaces of the angles 73 72 and holds them there. However, the magnet assembly, including the magnets 12 and the framework elements 70, 72 which mount the piston 76 can all be lifted as a unit by the pallet hoist through a distance great enough to operate parallel-connected signal microswitches LS-1 at opposite corners of the framework (FIG. 4). This operation of the limit switches LS-1 by the raising of the magnet assembly appears in FIGS. 1A and 5 and the operation of either switch lights a signal lamp S. This shows that the pallet hoist has been raised sufficiently to bring a pattern of cans up against the magnets so that when the magnets are energized all cans will be picked up and also indicates that raising of the pallet hoist should stop.

As seen in FIG. 1B, the magnets 12 are elongate rectangular bars formed to provide a three pole electromagnet. The magnets are formed of channels 12a to which a center pole piece 12b is screwed and the windings 12c are wrapped around the center pole piece. The windings 12c of the magnets are usually connnected in a series parallel arrangement in accordance with the voltage supplied to the magnets, the size of the windings and the desired current load for the magnets. Details of the number of windings, wire size and the dimensions of the pole pieces are not essential to the present invention, these being matters of electrical engineering which can be determined for a given size of pattern and weight range of cans to be handled.

The carriage C is reciprocated between its advanced position over the pallet hoist and its retracted position over the conveyor 20 by a pair of hydraulic cylinders 92 (FIGS. 1—3) having piston rods 94 that connect to carriage-mounted brackets 96. A limit switch LS-3 (FIG. 1) is operated upon the retraction of the carriage by a switch operator button 98 on one of the brackets 96 that mount the piston rod 94. The function of LS-3 is to deenergize the magnets for can release.

PALLET HOIST

In order to receive the tiers of pattern cans, the pallet hoist H is disposed between the conveyor sections K (FIGS. 2 and 3) and is beneath the magnetic head M (FIGS. 1 and 2) when the carriage C is in its advanced position. The details of this hoist are not critical to the present invention and hence the hoist is illustrated diagrammatically. The pallets P rest on a hoist carriage 100 which can be lowered between the conveyor sections K to receive a pallet load of cans and then incrementally raised by one can height, after each tier of cans is removed from the pallet.

The hoist carriage 100 (FIGS. 1 and 3) is mounted mounted on rollers 102 which slide on vertical tracks 104 forming a portion of the framework of the apparatus. The hoist carriage is raised and lowered by a frame mounted hydraulic cylinder 106, having a piston rod 108 that supports a crosshead 110. The crosshead mounts a sprocket shaft 112 carrying sprockets 113 over which are trained lifting chains 114. The chains themselves have one end anchored to the frame at 116 and the other to the hoist carriage at 118 (FIG. 1). Thus raising or lowering the piston rod 108 and the crosshead 112, raises or lowers the hoist carriage 100 by twice the piston travel.

As seen in FIG. 3, the pallet hoist K has a pallet delivery section 120 and a loaded pallet take away section 122. An intermediate section 124 of the pallet conveyor is spaced from the delivery and take away sections to accommodate the hoist carriage arms 126, when the latter are lowered. Thus pallets can be advanced from the delivery section onto the intermediate section with the carriage arms in their lowered positions, and lifting of the carriage arms by the hydraulic cylinder 106 will raise the pallet and bring it up toward the magnetic head M for unloading.

CONTROLS

The hydraulic piston 76 for raising and lowering the magnetic head M is controlled by a four-way solenoid valve 130 (FIG. 1). This valve is connected to a source of hydraulic fluid in a conventional manner, the details of which are not critical to the invention. A manual control of the parts not critical to the invention is disclosed herein. Thus, the solenoid valve 130 for the magnet piston may be raised and lowered by a switch 132 that operates the valve. This assembly is only used during loading, as explained in the aforesaid copending application.

The hoist cylinder 106 is controlled by a solenoid valve 134 (FIG. 1) and a raise and lower switch 136 that is manually operated. As previously explained, when the hoist has been raised sufficiently to fully seat a pattern of cans against the magnet, limit switches LS-1 are opened (FIG. 1A) which lights the signal lamp S and indicates that raising of the pallet hoist should be stopped by the control switch 136.

The hydraulic cylinders 92 that advance and retract the carriage C for the magnetic head are operated in parallel by conventional hydraulic techniques not shown in detail. The cylinders are simultaneously advanced or retracted by means of a solenoid valve 140 (FIG. 1) controlled by an advance and retract pushbutton 142. As mentioned, when the carriage C is fully retracted it opens the limit switch LS-3. The extremes of carriage motion are mechanically determined by stops in a conventional manner.

As part of the magnet energizing and deenergizing circuit a limit switch LS-2 (FIGS. 6 and 7) is mounted on one of the crosspieces 82 and forms part of the magnetic head. This limit switch is operated by a blade 150 that is pivoted to the crosspiece 82 at 152 and which moves up and down between a pair of magnets 12. When no cans are against the magnets, the lower portion of the blade 150 projects downwardly but when cans are brought up against the magnet by the pallet P and the hoist, the blade 150 is raised, operating the limit switch LS-2 for energizing the magnets, as will be described presently.

GENERAL DESCRIPTION OF THE CONTROL CIRCUIT

Before describing the operation of the control circuit, reference is made to FIG. 8 for a general description of the major elements thereof. In the embodiment shown, the loader is powered from an alternating current source AC. An SCR firing module F is connected to the AC source and contains a saturable core control winding of a magnetic amplifier which is part of the module. This module controls a rectifier bridge incorporating two silicon controlled rectifiers SCR-1 and SCR-2 and two diodes D1 and D2. The output of the bridge being positive and negative lines DC lines 160, 162 respectively. The details of the SCR firing module are not critical to the present invention and such items are supplied to the trade by a number of manufacturers. A suitable example of the SCR firing module and bridge is the CL-781 or CL-782 firing circuit module manufactured by Crydom Laboratories, Inc. of Santa Ana, Calif. and described in their published brochure "Crydom SCR Firing Circuit Modules" which is distributed to the trade. Firing modules for bridges of this type are also described in Bulletin 5001 of Jun. 1967 published by Firing Circuits, Inc., a Division of Marathon Electric Manufacturing Corp. of Norwalk, Conn. The title of this bulletin is "SCR Controls," and FIGS. 10 and 13, pages 4 and 5 are pertinent. Another firing circuit which can be utilized is described in the U.S. Pat. to Gutterman U.S. Pat. No. 3,386,026, May 28, 1968.

The DC power lines 160, 162 energize the magnets M and can be shorted in the direction of magnetic field collapses by a silicon controlled rectifier SCR-3 connected across the DC line. In order to supply a DC control voltage for the control winding of the SCR firing module F, an isolation stepdown transformer T-1 is connected across the AC line and supplies rectified DC voltage between positive and negative lines 164, 166 respectively. This rectified direct current is obtained from the transformer T1 the secondary of which is center tapped and diodes D3, D4 in accordance with conventional electrical engineering practice. A filter capacitor C1 smoothes out the control current, which may be supplied at about 6 to 8 volts.

A series resistor R1 and a Zener diode D5 across the control line limits the controlled current to a predetermined maximum value such as 8 volts. A normally open relay contact 3CR-1 is in the DC line 164. In this general discussion of the circuit, it will be noticed that there are relays and relay controlled switch contacts, the function of which will be best understood in the sequential operation of description of the circuit which follows. Accordingly, for the present, no full explanation of the relay switch contacts is presented.

A limit rheostat R3 is in the positive DC control line 164 and supplies current to paralleled potentiometers that provide either of two control currents in accordance with the present invention. These potentiometers are a "hold" potentiometer R4 and a "surge" potentiometer R5, each of which is connected through respective relay timing contacts (3CR-2, normally open but timed to close and 3CR-3, normally closed but timed to open) to one side 168 of the control line leading to the lining SCR firing module F. The other side 170 of the control line returns to the center tap of the power supply and isolation transformer T1 previously mentioned. The "hold" and "surge" control current provisions form the subject of the copending application of Chorney, Ser. No. 845,371 filed Jul. 28, 1969.

A silicon controlled rectifier clamping SCR-3 is connected across the magnets and its gate is connected to the positive DC control source line 164 by a line 172 through a current limiting resistance R2. The gate can also be connected by a relay contact 8CR-3 to the return line 166 of the DC control source. These cone connections either fire the silicon controlled rectifier SCR-3 or permit it to cut off when the collapse current through the magnets falls below the rated holding current of the rectifier (e.g. 5—200 MAO). However, even if the magnetic field collapse current were to fall to zero, residual magnetism would remain.

In accordance with the present invention, the operation of the field collapse rectifier SCR-3 in demagnetizing the magnets M is correlated with an AC demagnetizing source which supplies a rapidly decreasing (tapered) alternating current to the magnets after they have been deenergized, in order to rapidly reduce the flux density of the magnets to substantially zero so that the cans can be deposited on the conveyor belt without hangup. This demagnetizing circuit is supplied by an isolation transformer T2 connected across the AC line. The secondary winding of the transformer T2 which is connected across the DC magnet lines 160—162 is in series with a conventional type electric lamp 180 which is turned off by normally closed, simultaneously operating relay contacts 8CR-2 and 8CR-4.

The blade switch LS-2 (which is closed when the cans are brought up against the magnets), (FIGS. 6 and 7) and the carriage switch LS-3 (which is opened when the carriage C is retracted) are connected in series across the AC line with a control relay 3CR which operates various contacts as will be described presently. A slave relay 8CR is also connected across the AC line in series with a relay contact 3CR-5 which is operated by the relay 3CR just mentioned. The contact 3CR-5 is normally open, but when it is closed by energization of relay coil 3CR it is timed to reopen about 1.5 seconds after 3CR is deenergized, thus giving SCR-3 time to short out the magnets before the AC demagnetizing current is turned on.

Having presented a brief resume of the salient features of the control circuit, reference will now be made to the problems of quickly and completely demagnetizing the magnets in a manner which promotes high speed and foolproof operation and uniform deposit of cans onto the conveyor belt 22 without hangup.

DEMAGNETIZING PRINCIPLES

When the silicon controlled rectifier SCR-3 connected across the magnet supply lines 160, 162 is gated to conduct, it acts as diode and provides a path for the field collapse current of the magnets when the latter are deenergized. This form of demagnetization of the magnets is desirable because it does not require the use of contacts such as relays or the like which are subject to arcing and rapid deterioration. However, the mere positioning of a clamping diode across the magnets has been found to provide erratic demagnetization and occasional hangup of cans due to residual magnetism present. As mentioned, under the present invention, a rapidly tp tapering AC demagnetizing current is applied to the magnets and this is made possible by the use of the silicon controlled clamping rectifier SCR-3 instead of a diode because when the rectifier SCR-3 is cut off, it offers a very high resistance to current flow in both directions and hence does not short the demagnetizing circuit.

The means for providing a demagnetizing current of the proper characteristics under the present invention can be explained in connection with FIGS. 2A and 2B. In FIG. 2A the usual magnetic hysteresis curve is shown but is plotted in terms of magnet current against flux density. When a positive current is first applied to the magnet, starting at point O, the current and flux density curve follows the broken lines, the flux density rising steeply at first and then tapering off to a point of substantial saturation at point A. When, however, the magnetizing electromotive force or current is decreased, as by applying a negative-going current here thereto so that the current is reduced from its positive value at A towards a negative value, the flux density does not reach zero when the current reaches zero, but decreases along the line AR. The point R on the flux density axis is the remanence point and represents a magnetization that remains even though the magnet current has reached zero. If the negative-going current continues, the demagnetization curve continues on through a point Cf at which time the flux density has reached zero but a counter-electromagnetic source or negative current equal to Cf was required to reduce the flux density to zero. The demagnetization curve continues as the negative current increases to the negative saturation point B. The curve is symmetrical and upon reversal of the current through the magnet, and the magnetization curve follows the line B, R', Cf' and A.

In accordance with the present invention, advantage is taken of the hysteresis curve of the magnetic assembly employed for applying a tapering AC demagnetizing current to the magnet which will bring the residual flux density to zero over only a few cycles of a 60 cycle AC demagnetizing current. The principle of the mode of operation characteristic of the circuit of the present invention is illustrated in FIG. 2B.

In FIG. 2B it will be assumed that point A represents the flux density which remains after the silicon controlled rectifier SCR-3 has been cut off. Of course the flux density at A after SCR-3 operation will be much less than the flux density during magnet operation, but the demagnetizing currents to be applied will also be much less than the magnetizing current from the rectifier bridge. Hence the shape of the hysteresis curve is unchanged and point A will be a saturation point for the demagnetizing current selected. When the 60 cycle AC is applied for demagnetization, since the current is selected so that the flux density curve flattens out to saturation, the fact that a first half-cycle of the demagnetizing current may be going positive is immaterial because this provides substantially no additional flux density to the magnets. The first negative-going AC demagnetizing current is applied at an initial magnitude sufficient to cause the flux density curve to pass through the remanence point R previously referred to, which means that a counterforce or negative-going current Cf will be applied when the flux density reaches zero. Under the present invention, however, this negative-going current is applied through a rapidly heating resistance and hence does not demagnetize the magnets to the negative symmetry hysteresis point B previously referred to and shown in FIG. 2A. On the contrary, when the current reverses polarity the values will be at B' and the new remagnetization line starts from B' and continues up to a new positive saturation point A'. The AC demagnetizing current now changes polarity and the curve traces on a new and smaller hysteresis loop path to a still smaller negative flux density point B'' whereupon the polarity reverses again. The flux density curve now traces a path up to positive point A'' which is smaller still, whereupon polarity is reversed and the flux density is reversed back to the point B'''. A further reverse of polarity retraces the curve back to substantially zero flux density, after which the further application of the AC demagnetizing current has substantially no effect because the flux density will have been reduced to substantially zero, and the AC current will have dropped to so low a value because of the lamp 180 as to be relatively insignificant. Of course, it is recognized that this is just a schematic illustration of what has happened. The exact number of cyclic changes in current required to demagnetize the currents is not known except that the pole demagnetization occurs in such a short length of time that only a few AC cycles are required to produce the desired effects.

OPERATIONAL DESCRIPTION OF THE CIRCUIT

The operational description of the circuitry will be explained in steps with reference to the operational diagrams of FIGS. 8—12.

START—FIG. 8

The pallet hoist carriage 100 has been lowered enough so that the cans 10 are clear of the magnets M and the carriage has been advanced over the pallet hoist. With these conditions, the blade switch LS-2 is open thereby deenergizing the relay 3CR. The magnet frame 70 (FIG. 4) rests on angles 56 so that the signal lamp switch LS-1 is open and the signal lamp S is out. With LS-2 open because of the lowered cans, relay 3CR deenergized normally open contacts 3CR-1 in the control power supply line 164 are open and no firing signal is applied to control lines 168, 170 for the SCR firing module F.

Under these circumstances there is no DC power applied to the magnets through the DC power lines 160, 162.

Also, with relay 3CR thus deenergized, the contacts 3CR-5 in the supply line for the slave relay 8CR will have opened and relay 8CR is thereby deenergized. As mentioned, the contact 3CR-5 just mentioned are timed to open (TO) a short time after they have first been closed by energization of relay 3CR followed by deenergization of relay 3CR, the purposes of which will be explained presently. With the slave relay 8CR deenergized as just described, normally closed contacts (NC) 8CR-4 and 8CR-2 are closed and the demagnetization resistance lamp 180 is on from AC supplied by the isolation transformer T2.

Finally, with 3CR deenergized, the silicon controlled rectifier SCR-3 (provided to conduct collapse current from the magnets M) is cut off and offers a very high resistance in both directions to current flow and hence does not short out the AC demagnetization current flowing through the lamp 180 via contacts 8CR-4 and 8CR-2. SCR-3 is cut off at this time because when relay 8CR was deenergized by contacts 3CR-5 contacts 8CR-3 which are normally closed (NC) short the gate of SCR-3 to the return or ground line 166 of the DC control circuit. This grounding of the gate of SCR-3 causes the latter to cut off as soon as the current therethrough reaches some minimum or holding value (e.g. 5—200 MA).

To summarize the conditions shown in FIG. 8, blade switch LS-2 is open, 3CR is deenergized, contacts 3CR-1 are open and no firing signal is applied to the control winding of the firing module. No direct current is applied to the magnets from the bridge, the silicon controlled relay SCR-3 is cut off to provide a very high resistance path in either direction, and the AC demagnetizing current has been applied through the rapidly heating lamp 180. The demagnetizing current will have been applied for a sufficient length of time to remove all the residual magnetism from the magnets, the time required being in the order of one-tenth second.

The switch 136 for the pallet hoist can now be operated to raise the pallet for presenting cans to the magnets for unloading.

RAISE HOIST—FIG. 9

In FIG. 9 the pallet hoist has been raised until the top tier of cans 10 closes the blade switch LS-2, (FIG. 7—broken Slight additional raising of the hoist lifts the magnet frame and closes one or both limit switches LS-1 (FIG. 1A) lighting the signal lamp S indicating that the switch 136 should be operated to stop the pallet hoist elevation. As mentioned, the two switches LS-1 are in parallel but this connection is omitted in FIG. FIGS. 8—12 for clarity. These switches are set to close when their buttons are released. With the blade switch LS-2 closed, the relay 3CR is energized through LS-2 and through the carriage retract switch LS-3, the latter being closed when the carriage is advanced to bring the magnets over the pallet. Contacts 3CR-5 now close, energizing the slave relay 8CR. 8CR now opens the normally closed contacts 8CR-4 and 8CR-2, turning off the demagnetization lamp 180 and removing the AC demagnetizing source across the magnets.

Energization of 8CR also closes the normally closed contacts 8CR-3 thereby disconnecting the gate of the silicon control relay SCR-3 from neutral and connecting the gate through resistance R2 to the positive control line 164. The application of the control voltage on the gate of C SCR-3 readies SCR-3 for conduction.

Energization of relay 3CR also closes normally open contacts 3CR-1 in the control power line 164 thereby making signal current available to the control circuit. The positive line 168 of the control circuit for the control winding of the SCR firing module can be fed either through contacts 3CR-3 which are normally open and are timed to close about 3 seconds after 3CR is energized or through contacts 3CR-2 which are normally closed and are timed to open about 3 second after 3CR is energized. This feature is claimed in the copending U.S. application of Chorney, Ser. No. 845,371, filed Jul. 28, 1969. The details of such a timer are not essential to the circuit and a pneumatic timer relay of this type is sold to the trade as the Allen Bradley Pneumatic Timer No. 700 NT, manufactured by the Allen Bradley Co.

Thus, when the relay 3CR is energized and normally open contacts 3CR-1 are closed as just described, current from the control line 164 is fed through contacts 3CR-1 and tapped off from the "surge" potentiometer R5. This current is fed through the normally closed (but timed to open) contacts 3CR-2 to the control winding of the SCR firing module F. The potentiometer R5 will be set so that a surge signal current is applied which is higher than the normal signal current applied to the firing module control winding, in order that a higher than normal current will be supplied by the bridge to the magnets through the DC power lines 160, 162 The magnetic flux in the magnets is now higher than normal for initial gripping of the cans and pulling slightly misaligned or tilted cans into place to form a precise pattern under the magnets.

When 3CR was energized the normally open contacts 3CR-3 in the "hold" circuit started timing towards their closed position and the normally closed "surge" contacts 3CR-2 now supplying the surge signal to potentiometer R5, started timing toward their open condition, but for the first 3 seconds (for example) of the operation just described, the condition will be as shown in FIG. 9.

The fact that gate SCR-3 is connected to a plus voltage so that it can conduct does not effect the power flow through the magnets. This flow will be through the bridge diodes and silicon controlled rectifiers and will not be shorted by SCR-3. SCR-3 will conduct now only in response to a pulsating field collapse current which exceeds that from the power supply bridge.

LOWER HOIST, RETRACT CARRIAGE—FIG. 10

Immediately after the condition of FIG. 9 just described, the pallet control switch 136 is operated to lower the pallet and provide clearance between the pallet or cans thereon and the cans just picked up by the magnets. This will open the signal lamp switch LS-1 and the signal lamp S will go out signifying that the carriage can be retracted without interference. The carriage switch 142 can be operated to retract the carriage by means of the four-way valve 140 and the cylinder 92 as previously described. The cans themselves hold the blade switch LS-2 closed so that the magnets remain energized.

The relay 8CR remains energized through contacts 3CR-5 which will not start timing toward their open position until the relay 3CR is deenergized. The AC demagnetizing resistance lamp 180 remains off and SCR-3 is gated so that it can conduct, if required, by excessive magnetic field collapse currents that might occur in between power supply pulses.

In the present example, after about 3 seconds a lower current "hold" signal is applied to the control winding of the SCR firing module and the higher current "surge" signal is cut off. This is because the surge contact 3CR-2 will have timed open, and the "hold" contact 3CR-3 will have timed to close, and will supply a lower control current through the potentiometer R4. As mentioned, the surge and hold signal features of the circuit under description from the circuit matter of the copending U.S. application of Chorney, Ser. No. 845,371, filed Jul. 28, 1969.

CARRIAGE RETRACTED—FIG. 11

In the circuit condition shown in FIG. 11 the carriage has been retracted and stopped over the conveyor belt 22 and the switch actuator 98 on the carriage has opened contacts LS-3. Relay 3CR is now deenergized and normally open contacts 3CR-1 in the control power line 164 will open. Thus, no control signal is applied in lines 168, 170 to the control winding of the SCR firing module and no DC power is applied to the magnets through the lines 160, 162. Thus the magnetic field is collapsing in the magnets. In accordance with known principles or of physics, the collapse current flow through the magnets continues in the direction of the magnetizing so that the collapse cure current is shorted out by SCR-3 which has been gated to conduct through R2 and the DC control power line 164. This gating of the SCR coupled with the forward-going current pulse from the collapsing field of the magnets causes SCR-3 to conduct and rapidly degenerates the magnetic field in the magnets down to the remanence point R (FIG. 2A) corresponding to the initial flux density resulting from the magnetizing current.

Although the relay 3CR has been deenergized by the opening of carriage switch LS-3, the slave relay 8CR remains energized. This is because contacts 3CR-5 for relay 8CR have started timing toward their open position when 3CR was deenergized but are still closed. Thus, with 8CR still energized the normally closed contacts 8CR-4 and 8CR-2 in the circuit of the demagnetizing lamp circuit 180 remain open and the lamp is off and no demagnetizing AC is applied to the magnets through the demagnetizing circuit during the period when SCR-3 is carrying the magnet collapse current.

DROP CANS —DEMAGNETIZING—FIG. 12

In FIG. 12, the magnetic field in the magnets has collapsed sufficiently so that they are demagnetized and the cans dropped. This indicates that the operator can advance the carriage by means of the control switch 142 for the carriage operating piston 92. Well within 1.5 seconds of the time when SCR-3 was gated to conduct (FIG. 11), the rectifier SCR-3 will have conducted enough of the field collapse current to prevent large current pulses from feeding back into the rectifier bridge of the SCR firing module. After about 1.5 seconds have elapsed from the condition of FIG. 11 contacts 3CR-5 (which started timing toward their open position as soon as 3CR was deenergized) will have timed open and the slave relay 8CR is deenergized, as indicated in FIG. 12. This closes normally closed contacts 8CR-3 in the gate circuit of SCR-3 so that the gate of this relay is connected to neutral and C SCR-3 is cut off. SCR now cuts off because the collapse current soon reaches zero, although a substantial residual magnetic field R remains (FIG. 2A). With SCR-3 cut off it presents a very high resistance to current flow in both directions and hence will not short AC current flow between the DC magnet lines 160, 162 in either direction.

When 8CR is deenergized, contacts 8CR-4 and 8CR-2 revert to their normally closed condition and the AC demagnetizing lamp resistance 180 is turned on via the isolation transformer T2. A rapidly tapering AC demagnetizing source is now applied to the magnets M and after about six cycles the magnets are fully demagnetized in accordance with the principles previously described and illustrated in connection with FIG. 2A. This insures that all the cans will drop onto the conveyor 22 because the residual magnetism or flux density of the magnets is now substantially zero. The demagnetizing resistance lamp 180 will remain on and the demagnetizing current will continue to be applied so long as 3CR is deenergized as illustrated in FIG. 8, and the lamp 180 is not turned off until 3CR is reenergized as illustrated in FIG. 9. Since the demagnetizing resistance lamp 180 heats up rapidly to present a relatively high resistance to its circuit, substantially no magnetization of the magnets takes place through the AC demagnetizing circuit there being what might be considered an insignificant hysteresis loop generated about the zero flux axis of FIG. 2B.

This, in conclusion, with the circuit just described, not only can the initial heavy field collapse current be shorted by a silicon control rectifier (acting as a diode) to protect the power supply to the magnet, but this diode can be removed from the circuit (in effect) by proper gating so that a rapidly decreasing AC demagnetizing current can be applied across the same circuit. The AC demagnetizing current is applied through a rapidly heating resistance element so that this current tapers off within a few cycles, but in the meantime the current will have been sufficient to cause the initial cycles to pass through the remanence point R of the residual magnetism hysteresis curve (FIG. 2B) and hence will bring the flux density substantially down to zero almost immediately.

With the magnets demagnetized and the cans dropped onto the conveyor, the carriage is advanced using switch 142.

CHARACTERISTICS OF THE DEMAGNETIZING RESISTANCE

As previously mentioned, the demagnetizing resistance must have the characteristics of initial high current capacity, rapidly increasing resistance and long life. All of these characteristics are supplied by a conventional incandescent lamp wherein a tungsten-type filament is hermetically sealed in an inert gas, or vacuum. These lamps initially draw a relatively heavy current but since their filaments are of tungsten or the like and are hermetically sealed, the filaments can be of fine wire and they can be permitted to heat up to incandescense. Thus their resistance rises very rapidly thereby presenting the tapering AC demagnetizing supply previously mentioned.

The wattage of the lamp 180 must be selected for a given installation in accordance with the voltage of the current supply to the magnet and the amount of current to be drawn to the magnet in normal operation. Lamps of this type also have a fast recovery time in that they cool almost immediately when their current supply is cut off, thereby presenting a low resistance to the circuit when they are next energized. This permits a rapid cycle time of the apparatus.

In order to select the wattage of resistance lamp 180, the magnets are first energized by direct current and then turned off, leaving the residual magnetism. The magnets are then shorted with AC through a variable transformer (Variac) and the AC is manually decayed until the cans drop. If the cans do not drop it means that the initial setting of the Variac was not high enough, that is the flux curve did not decay through the remanence point R but decayed through a point somewhat lower than R on FIG. 2B. Thus, the experiment is repeated starting with a higher initial current from the Variac, which, when decayed results in complete demagnetization and dropping of the cans. By measuring the initial current through the Variac during these experiments and knowing the characteristics of the circuit, the proper wattage incandescent lamp 180 can be selected. If a lamp with too small a wattage is selected, the first demagnetization curve A-B' (FIG. 2B) will pass above the remanence point R and full demagnetization will not result. If a lamp 180 of too high a wattage is selected the lamp will not heat up rapidly enough, its resistance will not taper fast enough and some residual magnetism will occur unless the AC demagnetizing circuit is left on and in its isolated condition over a relatively long period of time. By properly selecting the wattage of the lamp 180, it is possible, as mentioned above, to demagnetize any given set of magnets within a few AC cycles.

As to component values, these can be selected in accordance with well-known principles in electrical engineering. The Zener diode D5 is selected to limit the control signal voltage to that which is maximum for the control winding of the SCR firing module, e.g. 8 volts. This control winding being part of a magnetic amplifier in accordance with well-known principles. The current limiting resistor R1 is selected to work with the Zener diode under well known principles. The limit rheostat R3 has been provided to prevent a signal on the control winding through either potentiometers R4 or R5 from exceeding a predetermined scale maximum and hence damage the SCR-5 module. This potentiometer can be 1,000 ohms. The hold and surge potentiometers in the example being given can be 2,000 ohms.

Although the best mode contemplated for carrying out the present invention has been herein shown and described, it will be apparent that modification and variation may be made without departing from what is regarded to be the matter of matter of the invention as set forth in the appended claims.

We claim:

1. Apparatus for transferring paramagnetic articles such as cans between a pallet or the like and a conveyor, said apparatus comprising the conveyor and means for supporting the pallet, a carriage, means for moving said carriage between positions overlying said pallet support means and said conveyor, electromagnets on said carriage, a DC source for said magnets, a silicon controlled clamping rectifier connected across said DC source and gated for passing current through said magnets only in the direction of the magnetic field collapse current, an AC source of demagnetizing current connected across said DC source; switch means for energizing said magnets through said DC source to pick up articles, for firing said clamping rectifier and for opening said AC demagnetizing source when said carriage is in one of its positions; switch means for deenergizing said magnets to release the articles, for cutting off said clamping rectifier and for energizing said AC demagnetizing source when the carriage is in its other position; said AC demagnetizing source including a rapidly heating resistance element for tapering off the demagnetizing AC.

2. The apparatus of claim 1, wherein said resistant element has sufficient cold current capacity so that the initial demagnetizing current surge through said resistance element is sufficient to bring the remaining flux density of the magnets through the remanence point of the magnetic hysteresis curve.

3. The apparatus of claim 2, wherein said resistance element comprises a hermetically sealed tungsten-type filament electric lamp.

4. The apparatus of claim 1, wherein said DC source comprises a rectifier bridge embodying silicon controlled rectifiers, an AC source for said bridge and a DC firing control circuit for said bridge operated by said magnet energizing switch means.

5. The apparatus of claim 4, wherein said AC demagnetizing source is derived from the AC source for said bridge by an isolation transformer.

6. The apparatus of claim 4, wherein said DC firing control circuit derives its energy from a stepdown transformer connected across said AC source for the rectifier bridge, and said clamping rectifier is triggered from said DC firing control circuit.

7. The apparatus of claim 1, wherein said magnet energizing switch means comprises an article-operated switch mounted on the magnets with a switch operator projecting below the magnets for switch closure when articles engage the magnets.

8. The apparatus of claim 7, wherein said switch means for firing said clamping rectifier is in series with said article-operated switch and is normally closed for firing the clamping rectifier, said clamping rectifier switch being positioned to be opened by said carriage when the latter is disposed for deenergizing the magnets and cutting off the clamping rectifier.

9. The apparatus of claim 1, wherein said switch means for said AC demagnetizing source includes timer contacts which energize the AC demagnetizing source soon after said switch means for the clamping rectifier cuts off the latter.

10. The method of magnetically conveying paramagnetic articles such as cans comprising the steps of energizing an electromagnet assembly with a rectified AC source for picking up the articles, shorting the magnets while energized in the direction of current flow caused by magnetic field collapse, deenergizing the magnets for releasing the articles while continuing the short across the magnets for dissipating the field collapse current, removing the short across the magnets and applying a rapidly tapering AC across the magnets for removing the residual magnetic field.

11. The method of claim 10, wherein said tapering AC is applied through a rapidly heating resistance of a value which initially passes enough current to demagnetize the magnets over a few cycles of the AC.

12. The method of claim 10, wherein said rectified AC source is developed from a silicon controlled rectifier bridge, and said magnets are shorted by a silicon controlled rectifier which is gated to fire in the direction of magnetic field collapse current.

13. The method of magnetically conveying articles such as cans comprising the steps of energizing an electromagnet assembly with a rectified AC source for picking up the articles, shorting the magnets while energized in the direction of current flow caused by magnetic field collapse, deenergizing the magnets for releasing the articles while continuing the short across the magnets for dissipating the field collapse current, removing the short across the magnets and applying a rapidly tapering AC across the magnets for removing the residual magnetic field, the first negative-going cycle of said AC applying sufficient current to cause the current-flux density curve to pass through the remanence point of the residual magnetic field.

14. The method of claim 13, wherein said rapidly tapering AC is applied through a hermetically sealed tungsten-type filament incandescent lamp.